(12) United States Patent
Feldman

(10) Patent No.: US 10,018,299 B2
(45) Date of Patent: Jul. 10, 2018

(54) WALL MOUNT FOR SCREENS WITH AUTOMATIC LOCKING MECHANISM

(71) Applicant: BARKAN MOUNTS LTD, Tel Aviv (IL)

(72) Inventor: Peter Feldman, Ariel (IL)

(73) Assignee: BARKAN MOUNTS LTD, Tel Aviv (IL)

( * ) Notice: Subject to any disclaimer, the term of this patent is extended or adjusted under 35 U.S.C. 154(b) by 0 days.

(21) Appl. No.: 15/068,711

(22) Filed: Mar. 14, 2016

(65) Prior Publication Data

US 2017/0261154 A1     Sep. 14, 2017

(51) Int. Cl.
*F16M 13/02* (2006.01)
*F16M 11/04* (2006.01)
*F16M 11/22* (2006.01)

(52) U.S. Cl.
CPC .......... *F16M 13/02* (2013.01); *F16M 11/041* (2013.01); *F16M 11/22* (2013.01); *Y10S 248/917* (2013.01)

(58) Field of Classification Search
CPC ...... F16M 11/041; F16M 13/02; A47B 97/00; A47B 2097/005; Y10S 248/917; Y10S 248/919–248/924
USPC ....... 248/917, 919, 920, 921, 922, 923, 924, 248/222.13, 222.51, 223.41, 225.21, 214, 248/215, 294.1; D8/373; D14/239, 451
See application file for complete search history.

(56) References Cited

U.S. PATENT DOCUMENTS

| | | | | |
|---|---|---|---|---|
| D517,085 S | * | 3/2006 | Deuschle | F16M 11/10 D14/451 |
| 7,070,156 B2 | * | 7/2006 | Liao | B60R 11/0235 248/225.21 |
| D528,901 S | * | 9/2006 | David | F16M 13/02 D8/373 |
| D532,290 S | * | 11/2006 | David | F16M 11/10 D8/373 |
| 7,334,766 B2 | * | 2/2008 | Ligertwood | F16M 11/10 248/201 |
| 7,441,739 B2 | * | 10/2008 | Huang | F16M 13/02 248/292.14 |
| 7,637,465 B2 | * | 12/2009 | Huang | F16M 13/02 248/215 |
| 7,722,002 B2 | * | 5/2010 | O'Keene | F16M 13/02 248/220.21 |
| 7,871,048 B2 | * | 1/2011 | Sculler | F16M 11/10 248/214 |
| D631,875 S | * | 2/2011 | Skull | D14/239 |
| 7,878,473 B1 | * | 2/2011 | Oh | A47G 1/24 248/205.1 |

(Continued)

*Primary Examiner* — Jonathan Liu
*Assistant Examiner* — Guang H Guan
(74) *Attorney, Agent, or Firm* — Soroker Agmon Nordman

(57) ABSTRACT

A wall mounting kit for mounting a screen on a wall, including a wall mount frame configured to be attached to the wall, one or more screen hook interfaces that are configured to be coupled to the screen and enable hanging the screen onto the wall mount frame, wherein the screen hook interfaces lock onto the wall mount frame so that the screen will not accidentally fall off by applying a force in a single direction; and wherein the screen hook interfaces are each formed by folding a cut out piece of a sheet of material without requiring additional elements to lock onto the wall mount frame.

10 Claims, 10 Drawing Sheets

(56) References Cited

U.S. PATENT DOCUMENTS

| | | | | |
|---|---|---|---|---|
| 8,025,264 B2* | 9/2011 | Cheng | ............... | H05K 5/0204 |
| | | | | 248/201 |
| 8,203,854 B2* | 6/2012 | Tsai | ............... | F16M 13/02 |
| | | | | 248/327 |
| 8,267,366 B2* | 9/2012 | Cheng | ............... | F16M 13/02 |
| | | | | 248/121 |
| 8,322,673 B2* | 12/2012 | Sculler | ............... | F16M 13/02 |
| | | | | 248/317 |
| 8,348,212 B2* | 1/2013 | O'Keene | ............... | F16M 13/02 |
| | | | | 248/222.14 |
| 8,517,322 B2* | 8/2013 | Lam | ............... | F16M 11/10 |
| | | | | 248/292.14 |
| 8,690,111 B2* | 4/2014 | Huang | ............... | F16M 11/041 |
| | | | | 248/276.1 |
| 9,395,043 B2* | 7/2016 | Stifal | ............... | F16M 11/10 |
| 2007/0262215 A1* | 11/2007 | Tan | ............... | F16M 11/10 |
| | | | | 248/201 |
| 2008/0156949 A1* | 7/2008 | Sculler | ............... | F16M 11/10 |
| | | | | 248/220.21 |
| 2009/0184221 A1* | 7/2009 | Sculler | ............... | F16M 13/02 |
| | | | | 248/221.11 |
| 2010/0038501 A1* | 2/2010 | Oh | ............... | F16M 11/10 |
| | | | | 248/201 |
| 2011/0011996 A1* | 1/2011 | Cheng | ............... | F16M 11/041 |
| | | | | 248/216.4 |
| 2011/0012001 A1* | 1/2011 | Cheng | ............... | F16M 11/10 |
| | | | | 248/294.1 |
| 2015/0136924 A1* | 5/2015 | Lachance | ............... | A47B 57/425 |
| | | | | 248/222.41 |
| 2017/0261154 A1* | 9/2017 | Feldman | ............... | A47B 97/00 |

* cited by examiner

US 10,018,299 B2

WALL MOUNT FOR SCREENS WITH AUTOMATIC LOCKING MECHANISM

TECHNICAL FIELD

The present invention relates to a wall mount for holding television or computer screens and more particularly to a wall mount having an automatic locking mechanism.

BACKGROUND

In recent years the classic cathode ray tube (CRT) computer and television screens have generally been replaced by thin screens based on liquid crystal display (LCD) or light emitting diode (LED) technology. Additionally the standard available screen size has increased. Instead of a maximum size of 32" or less a person can purchase television screens with a screen size of 40", 50" or even 80"-90".

The newer screens are much lighter than the older CRT screens and can conveniently be hung directly on a wall with an appropriate mounting interface also referred to as a TV wall mount. As shown for example in FIGS. 1A to 1C, mounting interface 100 typically includes a wall mount frame 110 and a screen hook interface 120 on the screen end that is designed to fit standard screw holes on the back of the screen according to the VESA standard.

The Video Electronics Standard Association (VESA) defined a family of standards known as the Flat Display Mounting Interface (FDMI) or VESA Mounting Interface Standard (MIS) defining the mounting interface size and distances between the screw holes on the mounting interface and on the back of the screen as a function of the screen size (diagonal) and weight.

The mounting interface is deployed by fixating the wall mount frame onto a wall 140, coupling the screen hook interface to the back of a screen 130 and then hanging the screen hook interface 120 onto the wall mount frame 110. The wall mount frame may include a level 190 to help align the wall mount frame.

In order to prevent the screen 130 from accidentally being knocked off the wall 140 screen hook interface 120 includes a screw 150 to lock the screen hook interface 120 against the wall mount frame 110, so that the screen 130 will not move relative to the wall mount frame 110.

The problems with this type of mounting interface 100 is that generally an elongated screwdriver 160 is required since it is hard to access the screw 150 once the screen 130 is mounted on the wall 140. Because of this difficulty in many cases the screw 150 is left unlocked and the screen 130 may be easily knocked off the wall 140 causing damage to the screen 130 and/or to people (e.g. children underneath). Additionally, the entire weight of the screen is laid on the upper bar of the wall mount frame 110 whereas the lower bar of the wall mount frame 110 only serves for stabilizing the wall mount frame 110 and for locking the screen hook interface 120.

FIGS. 2A-2B show an alternative mounting interface 200 that includes a wall mount frame 210 and a screen hook interface 220 on the screen end. The screen hook interface 220 includes a tooth 222 activated by a spring 224 to lock the screen hook interface 220 to the wall mount frame 210. The tooth 222 is provided with an inclined head so that when deployed it will be pushed down when pushed against a protrusion 212 of the wall mount frame 210 and will be lifted by the spring 224 when passing the protrusion 212 thus locking the screen hook interface 220 to the wall mount frame 210. Typically the tooth 224 is coupled to a string or wire 226 that can be pulled down to release the tooth 224 from locking the screen hook interface 220 to the wall mount frame 210.

Mounting interface 200 is generally more expensive than mounting interface 100 since it requires more elements than just a screw 150 and requires more effort to assemble. Additionally, like with mounting interface 100 the entire weight of the screen 130 is laid on the upper bar of the wall mount frame 210 whereas the lower bar of the wall mount frame 210 serves for stabilizing the wall mount frame 210 and for locking the screen hook interface 220.

SUMMARY

An aspect of an embodiment of the disclosure relates to a kit and method for mounting a screen on a wall. The kit includes use of a wall mount frame that is configured to be attached to the wall (e.g. using screws and anchors for a cement wall or using nails for a wooden wall) and one or more screen hook interfaces that are configured to be attached to the back of a screen (e.g. with screws in screw sockets on the back of the screen). The screen hook interfaces are designed to lock onto the wall mount frame so that they are not releasable by a force applied in a single direction (e.g. by a person colliding into the screen). Optionally, release of the screen from the wall mount frame requires lifting the screen in a first direction and then without letting go moving the screen in a second direction (e.g. perpendicular to the first direction).

In an exemplary embodiment of the disclosure, the wall mount frame includes an upper rail and a lower rail. Optionally, the screen hook interfaces attach to both the upper rail and the lower rail to lock the screen onto the wall mount frame. In an exemplary embodiment of the disclosure, the screen hook interfaces include an upper groove and a lower groove to match the upper rail and lower rail of the wall mount frame.

There is thus provided according to an exemplary embodiment of the disclosure, a wall mounting kit for mounting a screen on a wall, comprising:
    a wall mount frame configured to be attached to the wall;
    one or more screen hook interfaces that are configured to be coupled to the screen and enable hanging the screen onto the wall mount frame;
    wherein the screen hook interfaces lock onto the wall mount frame so that the screen will not accidentally fall off by applying a force in a single direction; and
    wherein the screen hook interfaces are each formed by folding a cut out piece of a sheet of material without requiring additional elements to lock onto the wall mount frame.

In an exemplary embodiment of the disclosure, the wall mount frame includes an upper vertical rail and a lower vertical rail. Optionally, the weight of the screen is supported by the upper vertical rail and the lower vertical rail. In an exemplary embodiment of the disclosure, the upper vertical rail locks into a matching upper groove and the lower vertical rail locks into a matching lower groove on the screen hook interfaces. Optionally, the lower groove is protected by an inclined nose that is part of the screen hook interface and causes the lower vertical rail to slide into the lower groove when pushing the screen toward the wall. In an exemplary embodiment of the disclosure, a self-opening prevention plane is situated below the lower groove as part of the screen hook interface to prevent the screen from being lifted upward and detaching the screen hook interfaces from the wall mount frame. Optionally, the wall mount frame is formed by folding a cut out piece of a sheet of material. In an exemplary embodiment of the disclosure, the screen hook interfaces are formed from the center of the sheet of material that was cut to form the wall mount frame. Optionally, the screen is supported by two screen hook interfaces. Alternatively, the screen is supported by more than two screen hook interfaces.

There is further provided according to an exemplary embodiment of the disclosure, a method of mounting a screen on a wall, comprising:

attaching a wall mount frame to the wall;
coupling one or more screen hook interfaces to a back of the screen to hang the screen onto the wall mount frame;
hanging the screen on the wall mount frame wherein the screen hook interfaces lock onto the wall mount frame so that the screen will not accidentally fall off by applying a force in a single direction; and
wherein the screen hook interfaces are each formed by folding a cut out piece of a sheet of material without requiring additional elements to lock onto the wall mount frame.

In an exemplary embodiment of the disclosure, the wall mount frame includes an upper vertical rail and a lower vertical rail. Optionally, the weight of the screen is supported by the upper vertical rail and the lower vertical rail. In an exemplary embodiment of the disclosure, the upper vertical rail locks into a matching upper groove and the lower vertical rail locks into a matching lower groove on the screen hook interfaces. Optionally, the lower groove is protected by an inclined nose that is part of the screen hook interface and causes the. lower vertical rail to slide into the lower groove when pushing the screen toward the wall. In an exemplary embodiment of the disclosure, a self-opening prevention plane is situated below the lower groove as part of the screen hook interface to prevent the screen from being lifted upward and detaching the screen hook interfaces from the wall mount frame. Optionally, the wall mount frame is formed by folding a cut out piece of a sheet of material. In an exemplary embodiment of the disclosure, the screen hook interfaces are formed from the center of the sheet of material that was cut to form the wall mount frame. Optionally, the screen is supported by two screen hook interfaces. Alternatively, the screen is supported by more than two screen hook interfaces.

BRIEF DESCRIPTION OF THE DRAWINGS

The present disclosure will be understood and better appreciated from the following detailed description taken in conjunction with the drawings. Identical structures, elements or parts, which appear in more than one figure, are generally labeled with the same or similar number in all the figures in which they appear. It should be noted that the elements or parts in the figures are not necessarily shown to scale and element or part may be relatively larger or smaller than actually shown.

DETAILED DESCRIPTION

Figure 1A:
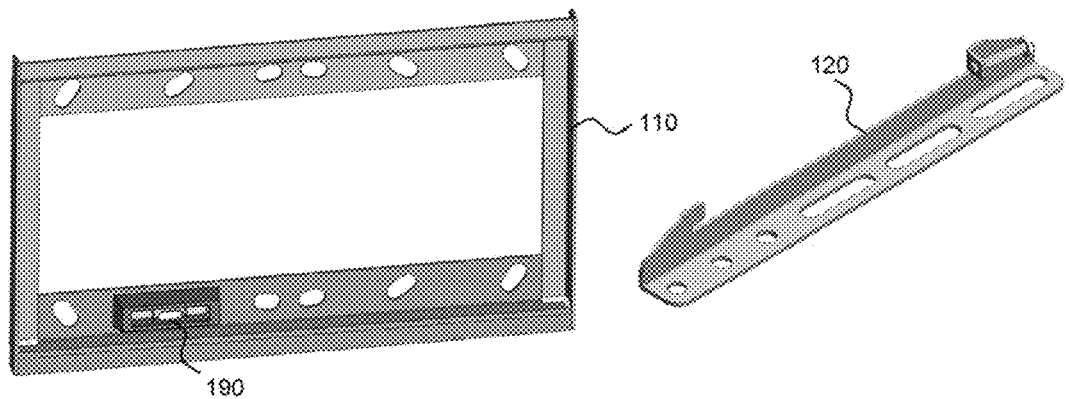
FIG. 1A is a schematic illustration of a typical mounting interface as known in the art.
Figure 1B:
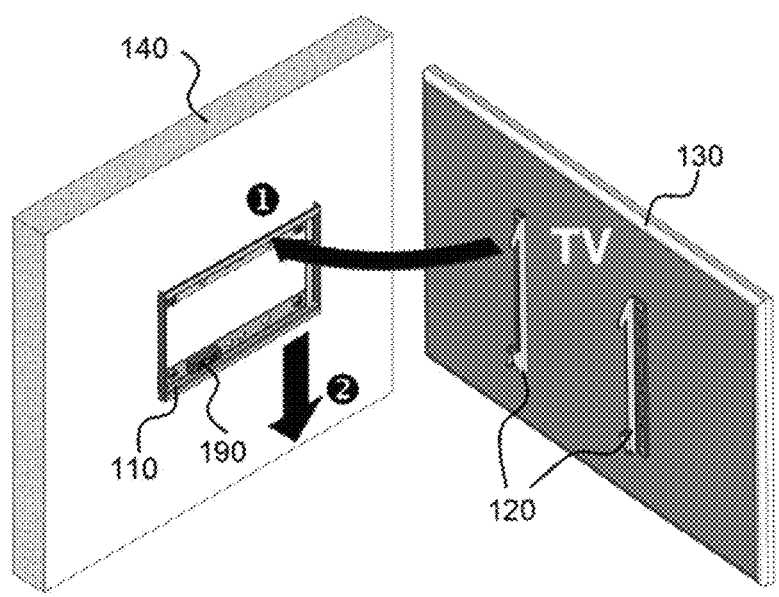
FIG. 1B is a schematic illustration of a deployed typical mounting interface as known in the art.
Figure 1C:
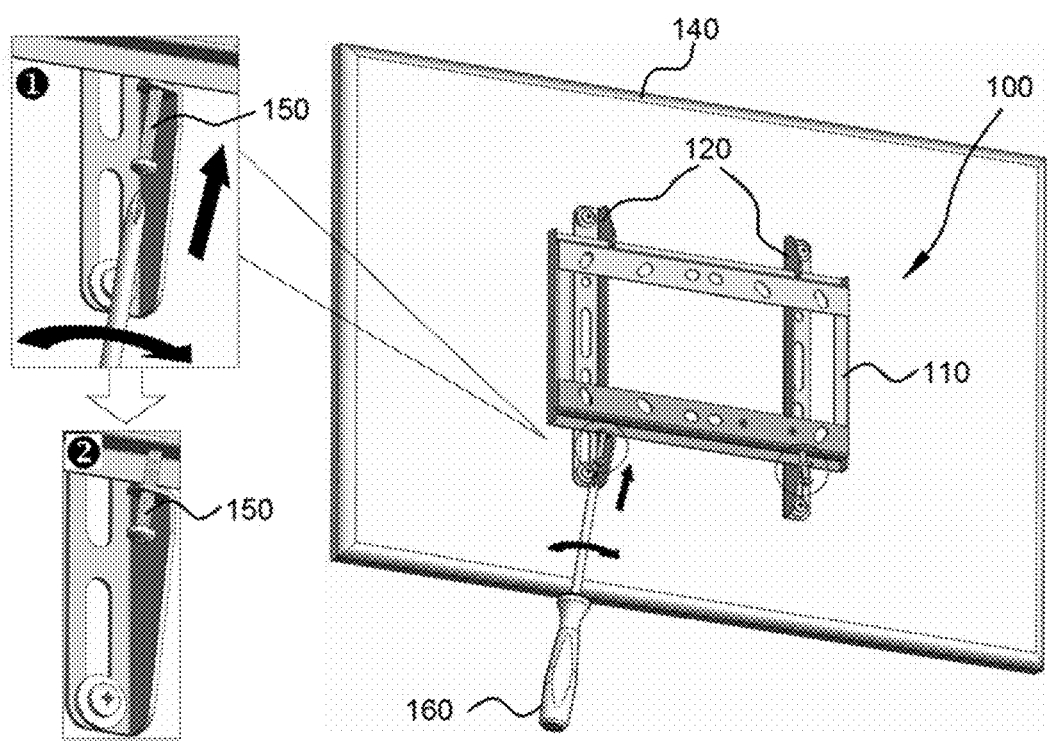
FIG. 1C is a schematic illustration of a locking mechanism of a deployed typical mounting interface as known in the art.
Figure 2A:
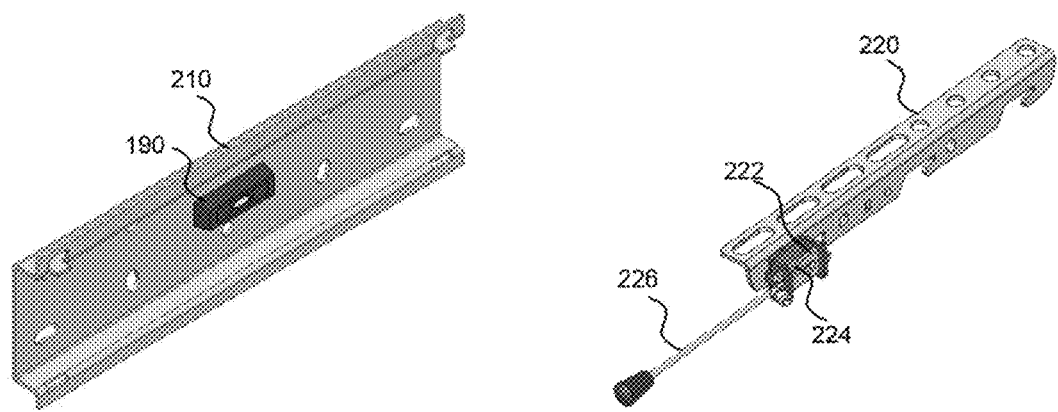
FIG. 2A is a schematic illustration of an alternative typical mounting interface as known in the art.
Figure 2B:
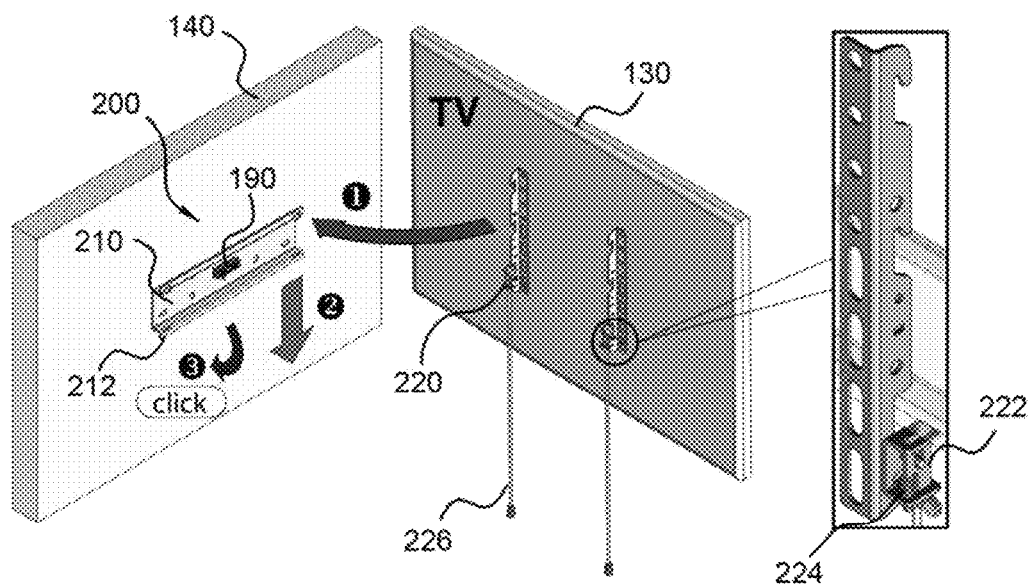
FIG. 2B is a schematic illustration of a deployed alternative typical mounting interface as known in the art.

FIGS. 3A-3E are schematic illustrations of a mounting interface 300 for mounting a screen 130 on a wall 140, according to an exemplary embodiment of the disclosure. In an exemplary embodiment of the disclosure, mounting interface 300 is provided as a kit including a wall mount frame 310 and one or more screen hook interfaces 320 (generally two are used although use of more or less is possible). The wall mount frame 310 is configured to be mounted on wall 140, for example using screws and anchors and/or nails depending on the material of the wall. The screen hook interface 320 is coupled to the screen 130, for example using screws. Optionally, wall mount frame 310 and screen hook interface 320 are provided with pre-prepared holes in positions that a user would be interested in placing screws, for example according to the VESA standard or other standards, so that the user does not need to drill holes when deploying the mounting interface 300.

In an exemplary embodiment of the disclosure, wall mount frame 310 has an upper vertical rail 330 and a lower vertical rail 340. Likewise screen hook interface 320 is shaped to form a matching upper groove 350 and a lower groove 360. Optionally, the lower groove 360 is protected by an inclined nose 370. In an exemplary embodiment of the disclosure, screen hook interface 320 is locked onto wall mount frame 310 by placing upper groove 350 onto upper vertical rail 330 and pushing the bottom of screen hook interface 320 against wall mount frame 310. Optionally, inclined nose 370 causes lower vertical rail 340 to slide into lower groove 360 and lock the screen hook interface 320 onto wall mount frame 310. In an exemplary embodiment of the disclosure, screen hook interface 320 is supported by upper vertical rail 330 and lower vertical rail 340 thus dividing the weight of screen 130 between the two rails (330, 340). Optionally, a thinner material can be used to form upper vertical rail 330 and lower vertical rail 340 since each one supports less weight.

In an exemplary embodiment of the disclosure, a self-opening prevention plane 380 is positioned below lower groove 360 to prevent screen hook interface 320 from being released accidentally by somebody colliding with the screen 130 and applying a force in a single direction. In contrast, removal of screen 130 from wall 140 requires the user to lift screen 130 upward vertically to clear upper groove 350 and lower groove 360 and then move the screen 130 horizontally away from the wall 140 so that lower vertical rail 340 will escape from the area confined between inclined nose 370 and self-opening prevention plane 380. In an exemplary embodiment of the disclosure, applying a force in a single direction will not release the lock. Only lifting in a first direction and then moving horizontally at about 90 degrees to the first direction will enable release of the lock.

In exemplary embodiment of the disclosure, as shown in FIGS. 3A-3E, screen hook interface 320 at an upper end has (see FIG. 3D) a substantially horizontal top edge 351, a side edge 352 sloping outwardly and downwardly from the substantially horizontal top edge 351 and a substantially vertical edge 353 extending from the side edge 352. The substantially vertical edge 353 at the upper end is an outer edge of a substantially rectangular tooth shaped piece 354 that defines one side of the upper groove 350 for hanging the screen hook interface from the wall mount frame 310. In contrast at a lower end the screen hook interface 320 has a substantially horizontal bottom edge 361, a side edge 362 sloping outwardly and upwardly from the substantially horizontal bottom edge 361, a substantially vertical edge 363 extending upwardly from the side edge 362 wherein the self-opening prevention plane 380 extends inwardly from the substantially vertical edge 363 at the lower end.

Figure 3A:
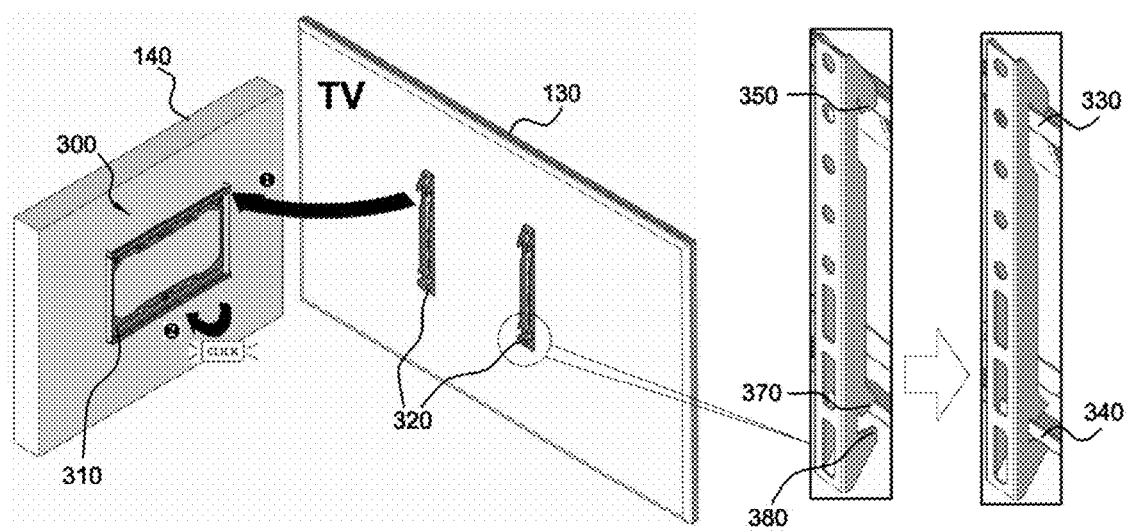
FIG. 3A is a schematic illustration of a mounting interface, according to an exemplary embodiment of the disclosure.
Figure 3B:
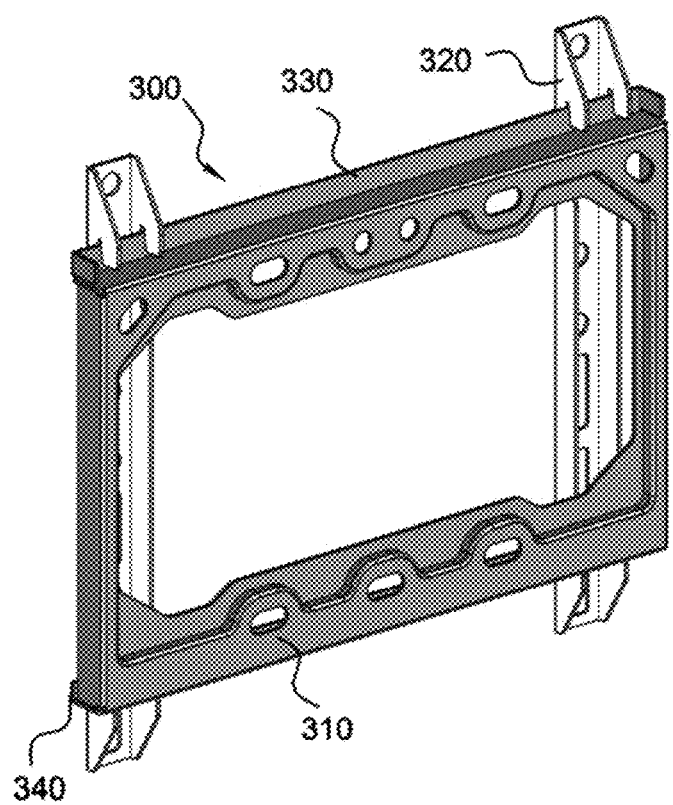
FIG. 3B is a schematic illustration of a back view of a deployed mounting interface, according to an exemplary embodiment of the disclosure.
Figure 3C:
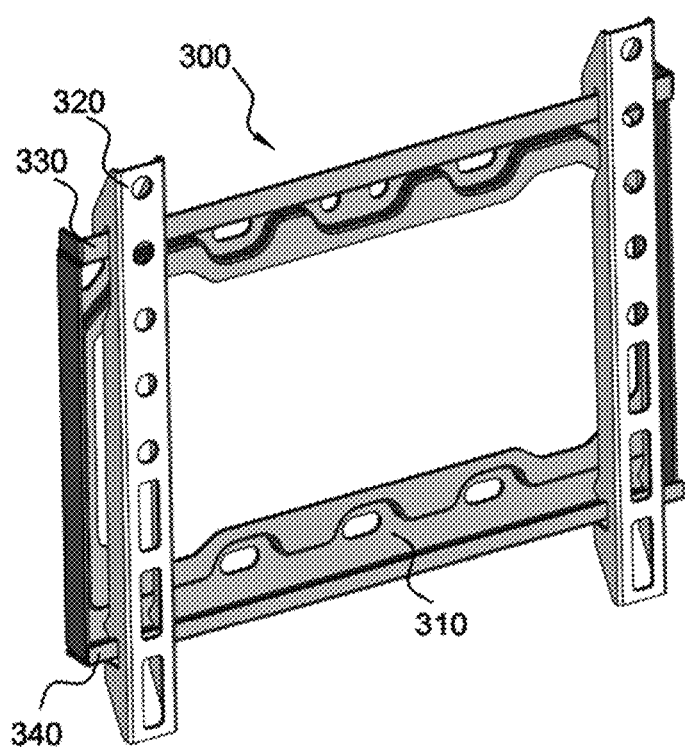
FIG. 3C is a schematic illustration of a front view of a deployed mounting interface, according to an exemplary embodiment of the disclosure.
Figure 3D:
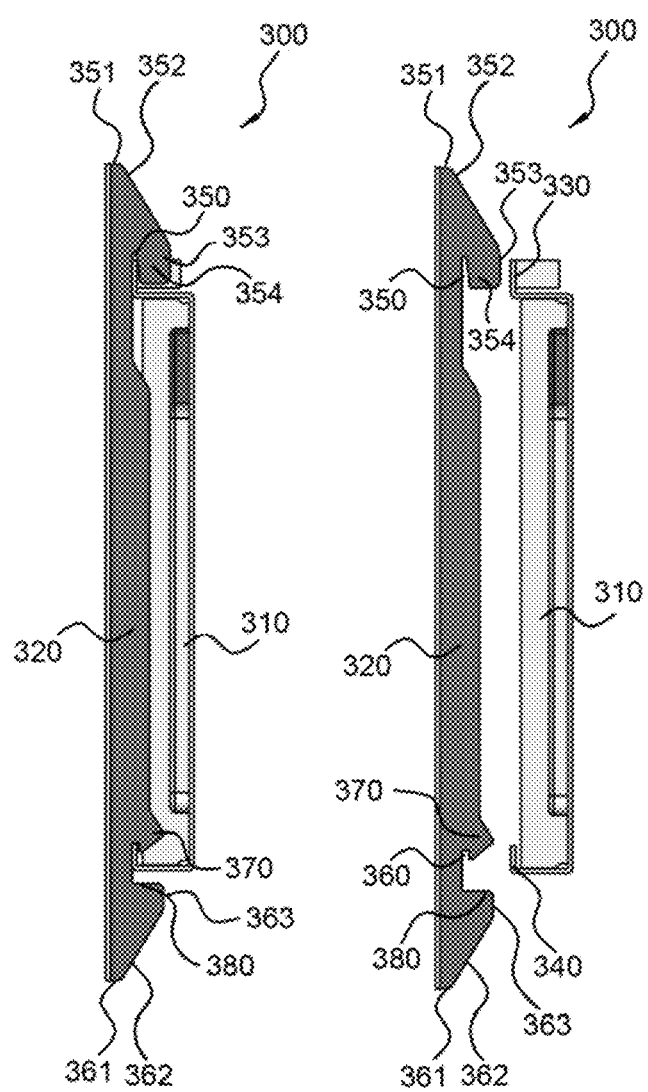
FIG. 3D is a schematic illustration of a side view of a mounting interface in a locked and opened position, according to an exemplary embodiment of the disclosure.
Figure 3E:
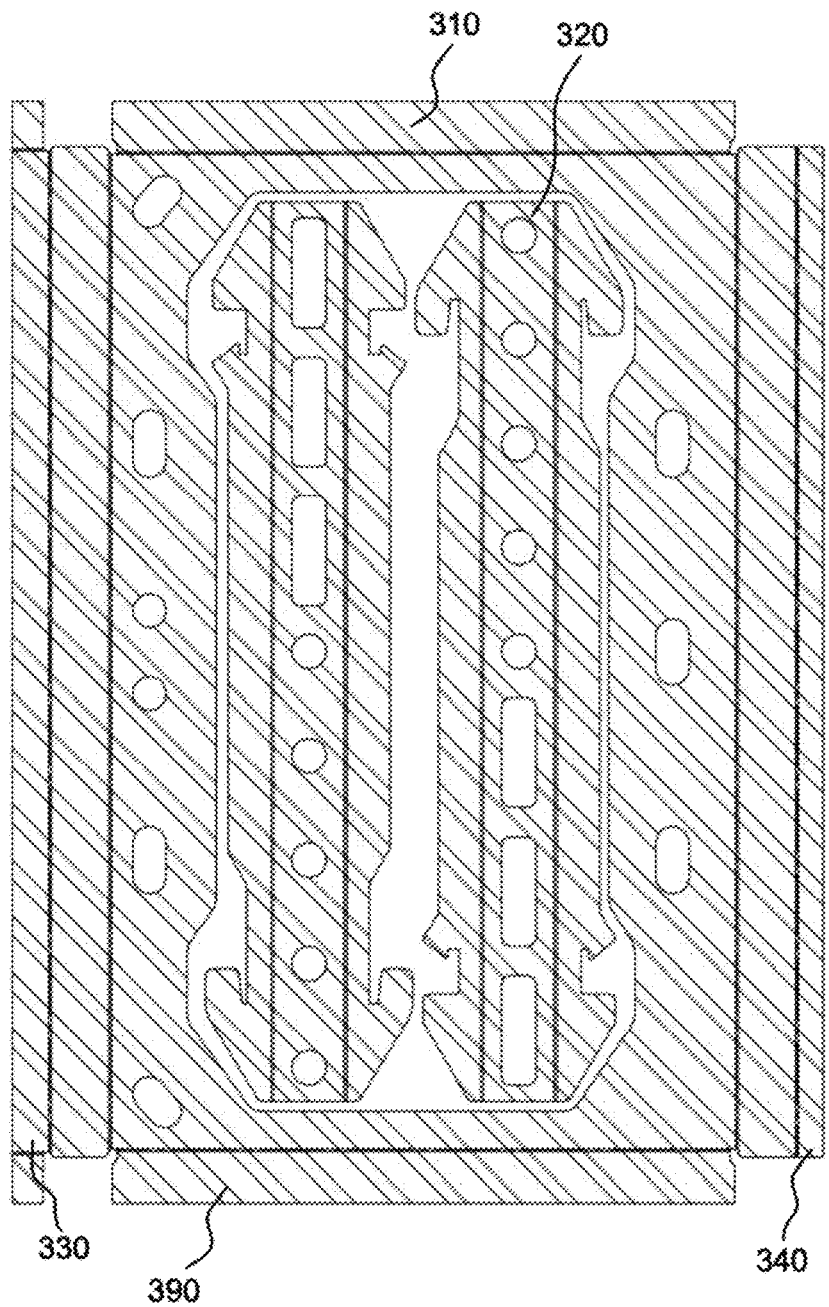
FIG. 3E is a schematic illustration of a sheet of material for forming a mounting interface, according to an exemplary embodiment of the disclosure.

In an exemplary embodiment of the disclosure, screen hook interface 320 is cut out and folded up from a single sheet 390 (e.g. of metal) that is designed to independently lock onto wall mount frame 310 and prevent screen 130 from accidentally falling. Screen hook interface 320 does not require coupling additional elements such as screws 150 or teeth 224 for the locking mechanism. This simplifies the construction and reduces the cost of preparing mounting interface 300, since there is no need to attach additional elements. In an exemplary embodiment of the disclosure, wall mount frame 310 is also folded from a single sheet 390. Optionally, both screen hook interface 320 (e.g. two units) and wall mount frame 310 are cut out from a single sheet 390. Optionally, as shown in FIG. 3E the center of the sheet 390 provides the material for the screen hook interface 320 units and the circumference surrounding the center is used to form wall mount frame 310. In an exemplary embodiment of the disclosure, sheet 390 may be made from metal or plastic or other solid material that is strong enough to support a screen.

In an exemplary embodiment of the disclosure, two screen hook interfaces 320 are generally used to support screen 130 on wall mount frame 310. Alternatively, one screen hook interface 320 can be used or more than two, for example 3 or 4.

It should be appreciated that the above described methods and apparatus may be varied in many ways, including omitting or adding steps, changing the order of steps and the type of devices used. It should be appreciated that different features may be combined in different ways. In particular, not all the features shown above in a particular embodiment are necessary in every embodiment of the disclosure. Further combinations of the above features are also considered to be within the scope of some embodiments of the disclosure. It will also be appreciated by persons skilled in the art that the present disclosure is not limited to what has been particularly shown and described hereinabove.

I claim:

1. A wall mounting kit comprising:
a wall mount frame configured to be attached directly to a wall, wherein the wall mount frame consists of a solid cut out piece manufactured from a sheet of material;
one or more screen hook interfaces that are configured to be coupled to a screen to enable hanging the screen onto the wall mount frame;
wherein the one or more screen hook interfaces are configured to lock onto the wall mount frame so that the one or more screen hook interfaces will not accidently detach from the wall mount frame by applying a force in a single direction;
wherein the one or more screen hook interfaces each consist of a solid cut out piece manufactured from the sheet of material;
wherein the wall mount frame includes an upper vertical rail and a lower vertical rail;
wherein the upper vertical rail locks into a matching upper groove at an upper end of the one or more screen hook interfaces in an assembled state of the wall mounting kit, and the lower vertical rail locks into a matching lower groove at a lower end of the one or more screen hook interfaces in the assembled state of the wall mounting kit, the upper groove is vertically aligned with the lower groove;
wherein the lower groove is protected by an inclined nose that is part of the one or more screen hook interfaces and causes the lower vertical rail to slide into the lower groove when pushing the one or more screen hook interfaces toward the wall mount frame;
wherein a self-opening prevention plane is situated below the lower groove as part of the one or more screen hook interfaces to prevent the one or more screen hook interfaces from being lifted upward and detached from the wall mount frame;
wherein at the upper end, the one or more screen hook interfaces have a substantially horizontal top edge, a side edge sloping outwardly and downwardly from the substantially horizontal top edge and a substantially vertical edge extending from the side edge, the substantially vertical edge at the upper end is an outer edge of substantially rectangular tooth shaped piece that defines one side of the upper groove; and
wherein at the lower end, the one or more screen book interlaces have a substantially horizontal bottom edge, a side edge sloping outwardly and upwardly from the substantially horizontal bottom edge, and a substantially vertical edge extending upwardly from the side edge, wherein the self-opening prevention plane extends inwardly from the substantially vertical edge at the lower end.

2. A wall mounting kit according to claim 1 wherein the upper vertical rail and the lower vertical rail are configured to both support a weight of the screen coupled to the one or more screen hook interfaces.

3. A wall mounting kit according to claim 1, wherein the one or more screen hook interfaces have a size and a shape that allow the one or more screen hook interfaces to be formed from a sheet taken from a center of the sheet of material that was cut to form the wall mount frame.

4. A wall mounting kit according to claim 1, wherein the one or more screen hook interfaces comprise two screen hook interfaces to support the screen.

5. A wall mounting kit according to claim 1, wherein the one or more screen hook interfaces comprise more than two screen hook interfaces to support the screen.

6. A method of mounting a screen on a wall, comprising:
obtaining a wall mounting kit, the wall mounting kit comprising:
a wall mount frame configured to be attached directly to the wall, wherein the wall mount frame consists of a solid cut out piece manufactured from a sheet of material;

one or more screen hook interfaces that are configured to be coupled to the screen to enable hanging the screen onto the wall mount frame;
wherein the one or more screen hook interfaces are configured to lock onto the wall mount frame so that the one or more screen hook interfaces will not accidently detach from the wall mount frame by applying a force in a single direction;
wherein the one or more screen hook interfaces each consist of a solid cut out piece manufactured from the sheet of material;
wherein the wall mount frame includes an upper vertical rail and a lower vertical rail;
wherein the upper vertical rail locks into a matching upper groove at an upper end of the one or more screen hook interfaces in an assembled state of the wall mounting hit, and the lower vertical rail locks into a matching lower groove at a lower end of the one or more screen hook interfaces in the assembled state of the wall mounting kit, the upper groove is vertically aligned with the lower groove;
wherein the lower groove is protected by an inclined nose that is part of the one or more screen hook interfaces and causes the lower vertical rail to slide into the lower groove when pushing the one or more screen hook interfaces toward the wall mount frame;
wherein a self-opening prevention plane is situated below the lower groove as part of the one or more screen hook interfaces to prevent the one or more screen hook interfaces from being lifted upward and detached from the wall mount frame;
wherein at the upper end, the one or more screen hook interfaces have a substantially horizontal top edge, a side edge sloping outwardly and downwardly from the substantially horizontal top edge and a substantially vertical edge extending from the side edge, the substantially vertical edge at the upper end is an outer edge of a substantially rectangular tooth shaped piece that defines one side of the upper groove; and
wherein at the lower end, the one or more screen hook interfaces have a substantially horizontal bottom edge, a side edge sloping outwardly and upwardly from the substantially horizontal bottom edge, and a substantially the side edge, wherein the self-opening prevention plane extends inwardly from the substantially vertical edge at the lower end;
attaching the wall mount frame to the wall;
coupling the one or more screen hook interfaces to a back of the screen to hang the screen onto the wall mount frame; and
hanging the screen on the wall mount frame.

7. A method of mounting a screen on a wall according to claim 6, wherein the upper vertical rail and the lower vertical rail are configured to both support a weight of the screen coupled to the one or more screen hook interfaces.

8. A method of mounting a screen on a wall according to claim 6, wherein the one or more screen hook interfaces have a size and a shape that allow the one or more screen hook interfaces to be formed from a sheet taken from a center of the sheet of material that was cut to form the wall mount frame.

9. A method of mounting a screen on a wall according to claim 6, wherein one or more screen hook interfaces comprise two screen hook interfaces to support the screen.

10. A method of mounting a screen on a wall according to claim 6, wherein the one or more screen book interfaces comprise more than two screen hook interfaces to support the screen.

* * * * *